United States Patent [19]

Dougherty

[11] Patent Number: 4,937,757
[45] Date of Patent: Jun. 26, 1990

[54] DIGITAL CIRCUIT INTERRUPTER WITH SELECTABLE TRIP PARAMETERS

[75] Inventor: John J. Dougherty, Avon, Conn.

[73] Assignee: General Electric Company, New York, N.Y.

[21] Appl. No.: 256,337

[22] Filed: Oct. 11, 1988

[51] Int. Cl.$^5$ .................... H02H 3/093; G01R 19/00
[52] U.S. Cl. ..................................... 364/492; 364/483; 361/97
[58] Field of Search .................. 364/492, 550, 551.01, 364/481, 483, 577, 723, 748.5; 361/96, 97, 93-95

[56] References Cited

U.S. PATENT DOCUMENTS

| | | | |
|---|---|---|---|
| 3,590,326 | 6/1971 | Watson | 361/96 |
| 4,017,766 | 4/1977 | Vercellotti et al. | 361/94 X |
| 4,219,858 | 8/1980 | DePuy et al. | 364/483 X |
| 4,266,259 | 5/1981 | Howell | 361/97 |
| 4,275,445 | 6/1981 | Elizaran | 364/480 |
| 4,432,031 | 2/1984 | Premerlani | 361/97 |
| 4,468,714 | 8/1984 | Russell | 361/62 |
| 4,480,242 | 10/1984 | Castonguay et al. | 335/194 |
| 4,550,360 | 10/1985 | Dougherty | 361/93 |
| 4,672,501 | 6/1987 | Bilac et al. | 361/96 |
| 4,680,706 | 7/1987 | Bray | 364/492 |
| 4,717,985 | 1/1988 | Demeyer | 361/96 |
| 4,722,059 | 1/1988 | Engel et al. | 361/96 X |
| 4,814,935 | 3/1989 | Arinobu et al. | 361/97 X |
| 4,819,124 | 4/1989 | Arinobu | 361/96 X |
| 4,827,369 | 5/1989 | Saletta et al. | 361/97 X |

FOREIGN PATENT DOCUMENTS

| | | | |
|---|---|---|---|
| 1513152 | 6/1973 | Fed. Rep. of Germany | 361/97 |
| 0048002 | 2/1980 | U.S.S.R. | 361/97 |

OTHER PUBLICATIONS

Serial No. 232,035 entitled, "Circuit Breaker with Removable Display and Keypad", R. Danek, filed 8/15/88 (41PR-6665) (now U.S. Pat. No. 4,870,531).

Docket 41PR-6557 entitled, "Digital Circuit Interrupter with Electric Motor Trip Parameters", J. Dougherty.

Primary Examiner—Parshotam S. Lall
Assistant Examiner—Joseph L. Dixon
Attorney, Agent, or Firm—Richard A. Menelly; Walter C. Bernkopf; Fred Jacob

[57] ABSTRACT

A digital circuit interrupter includes a microprocessor programmed for tailored overcurrent protection to power systems. A communication link permits the overcurrent set points to be selectively set within the microprocessor memory from a remote location. The overcurrent trip parameters are then derived by an algorithm which resides in the microprocessor memory.

10 Claims, 6 Drawing Sheets

DIGITAL CIRCUIT INTERRUPTER WITH SELECTABLE TRIP PARAMETERS

BACKGROUND OF THE INVENTION

Industrial power circuit protection is currently provided by thermal, magnetic, electromechanical and electronic circuit interruption devices tailored to respond to an inverse time-overcurrent function. A longtime delay before circuit interruption is provided for a low overload current value while a shorter time delay is provided for a higher overload current. Upon the occurrence of a short circuit current, the circuit must be interrupted instantaneously.

The thermal and magnetic trip units used within circuit breakers fairly approximate a time-overcurrent relationship which varies with the first power of time and with the second power of current ($I^2t$), whereas the induction discs used within electromechanical relays, for example, follow a polynomial relationship between current and time which approximates the $I^2t$ relation to a lesser extent. A good description of the operation of an electromechanical relay is found within a paper entitled "Digital Immerse Time Overcurrent Relay Using Counters" by M. Ramamoorty, which appeared in the ECI Journal, EL, 1980.

Time-overcurrent trip parameters for electronic circuit interruption devices of the so-called "analog" type use the delay characteristics of an electronic component such as a capacitor to determine the longtime and shorttime delays before circuit interruption. U.S. Pat. No. 4,266,259 describes one such analog circuit interrupter.

Time-overcurrent trip parameters for electronic circuit interrupters of the so-called "digital" type are stored in electronic memory and are utilized within a microprocessor to provide long-time and short-time interruption. One example of a digital circuit interrupter is found within U.S. Pat. No. 4,672,501.

To provide interlock system coordination between interconnected electronic circuit interrupters, the downstream circuit interrupter signals the upstream circuit interrupter to delay the upstream circuit interrupter until the downstream circuit interrupter has reacted to clear an impending fault. One example of interlock function between electronic circuit interrupters is found in U.S. Pat. No. 4,468,714, which Patent is incorporated herein for purposes of reference.

When an electronic circuit interrupter is used as a main circuit interrupter within power distribution systems employing electromechanical relays or thermal and magnetic trip devices within branch circuits, some means of coordination is ordinarily required in order for the interruption device closest to the fault to interrupt the branch circuit before the electronic circuit interrupter interrupts the main circuit.

An early attempt to coordinate between electromechanical relays by using a digital electronic circuit interrupter is found within U.S. Pat. No. 4,275,445. A recent means for coordinating a digital circuit interrupter within circuits containing electric motors is described within U.S. patent application Ser. No. 256,357 filed Oct. 11, 1988 which Application is incorporated herein for purposes of reference.

Although such digital electronic circuit interrupters containing microprocessors programmed for specific time-overcurrent interruptions are known and commonly used, no such circuit interrupter is presently commercially available that can be tailored to fit a wide variety of time-overcurrent trip parameters such as found within the earlier described non-electronic interruption devices. One purpose of the instant invention, accordingly, is to describe a digital electronic circuit interrupter that can be custom-tailored in the factory or in the field to provide system coordination within specific power distribution systems containing both electronic as well as non-electronic circuit interruption devices.

DESCRIPTION OF THE PREFERRED EMBODIMENT

Figure 1:
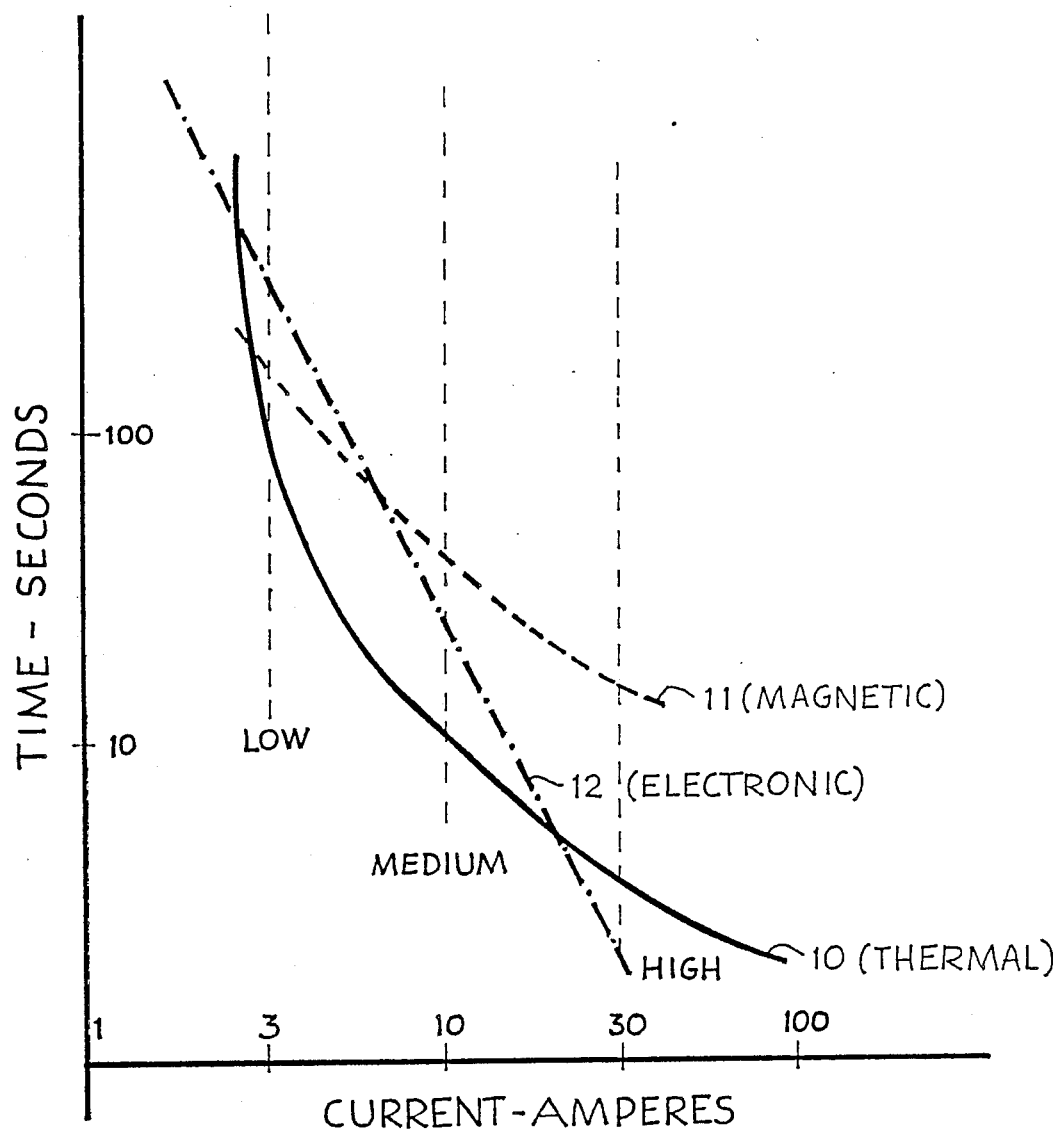
FIG. 1 is a graphic representation of the tripping time as a function of current for various circuit interruption devices.

Before describing the tailored overcurrent protection parameters of the invention, it is helpful to review the time-overcurrent parameters of various circuit interruption devices as depicted in FIG. 1. A thermal relay or thermal circuit interrupter follows the characteristic depicted at 10 over the low, medium and high current range of protection and approximates an $I^2t$ relation whereby the time allowed before tripping an overcurrent condition is inversely proportional to the second power of the current. A longer time period is accordingly allowed before interrupting a low overcurrent value compared to a relatively short-time increment before interrupting a high overcurrent condition.

A magnetic induction disc relay which balances electrical energy generated from the sensed circuit current against the force of a calibrated spring to control the motion of a disc generates the time-overcurrent curve depicted at 11 and is generally adjusted at the point of installation for specific circuit requirements. The aforereferenced publication entitled "Digital Inverse Time-Overcurrent Relay Using Counters" describes the operation of one such magnetic induction relay.

The time-overcurrent response for an electronic circuit breaker is indicated at 12 for an analog signal processor such as described in U.S. Pat. No. 4,266,259 wherein the response is derived from the relationship $I^2t = K$ and the trip-time calibrations are determined by discrete devices such as capacitors and diodes. A digital signal processor such as described in the aforementioned U.S. Pat. No. 4,672,501 employs a microprocessor to continuously calculate a time-overcurrent response curve in accordance with stored algorithms.

It is noted that the time-overcurrent curves for all three devices vary somewhat in their trip-time responses in the transition from the low, medium to high overcurrent ranges. When such devices are used simultaneously within an electrical distribution system, some means must be employed to insure that the device closest to the source of the overcurrent condition responds earlier than an upstream device to prevent so-called "nuisance tripping".

When the electronic circuit interrupters are used as upstream and downstream circuit interruption devices within a common electrical distribution system, the electronic circuit interrupters can be interconnected to insure that the downstream circuit interrupter reacts to interrupt the fault before the upstream breaker. Aforementioned U.S. Patent 4,468,714 describes one such method of interconnecting the electronic circuit interrupters.

Figure 2:
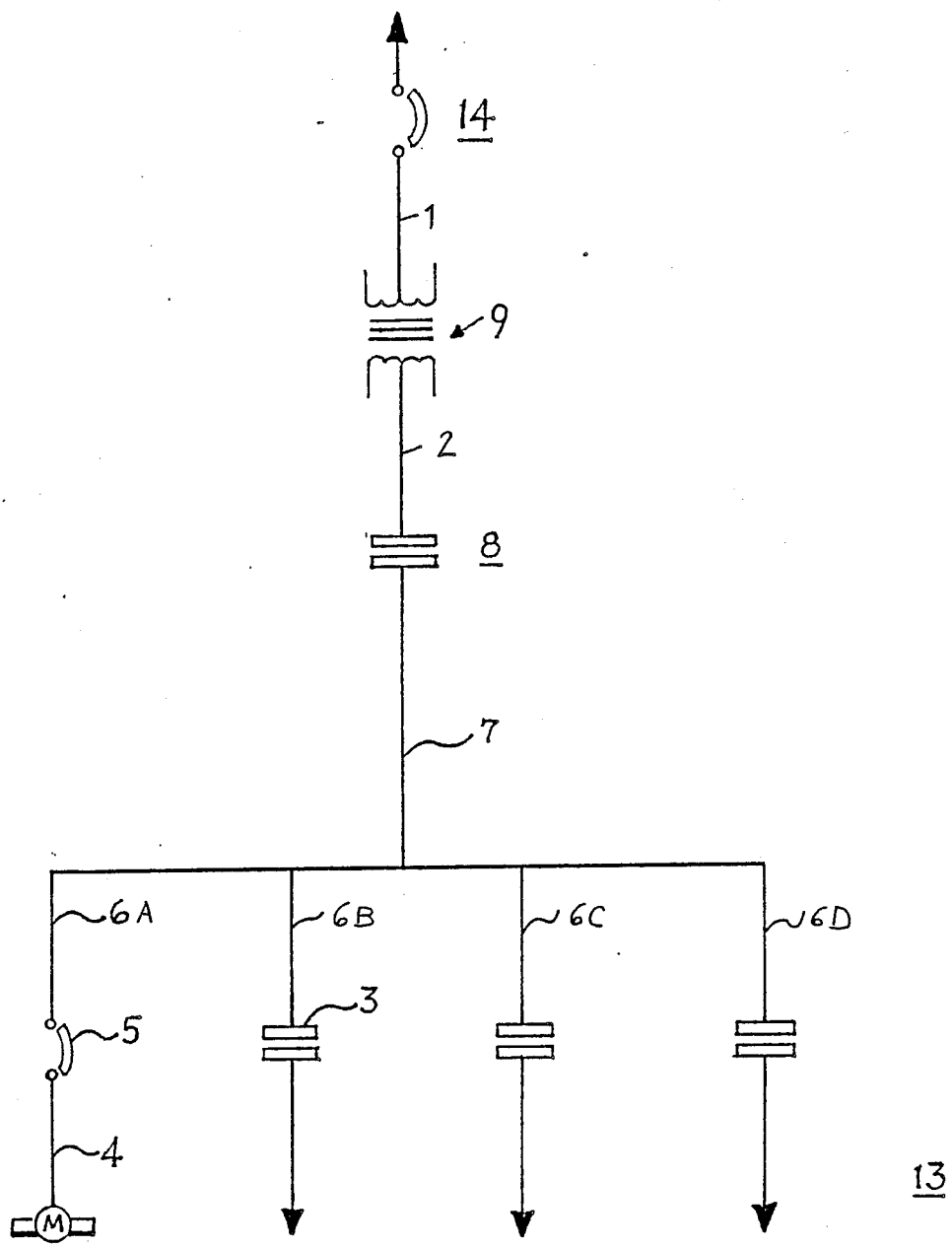
FIG. 2 is a diagrammatic representation of a simple industrial power distribution system.

FIG. 2 shows a simple industrial power distribution circuit 13 wherein a magnetic induction disc or relay 14 is employed on the primary main feeder cable of a three-phase power distribution system, of which only one-phase conductor 7 is described herein. The main secondary feeder cable 2 on the opposite side of the power distribution transformer 9 is protected by an electronic circuit interrupter 8 of the type described within aforementioned U.S. Pat. No. 4,672,501 which connects through the secondary main feeder cable 7 to a plurality of branch feeder cables, as indicated at 6A-6D. Branch feeder cable 6A is protected by means of a thermal magnetic relay 5 having the trip parameters indicated at 10 in FIG. 1 and which includes an electric motor 4 as one example of an industrial device. The use of a thermal magnetic relay to protect induction devices, such as electric motors and furnaces is common within such industrial power distribution circuits.

Branch feeder cables 6B-6D each contain a thermal magnetic circuit breaker such as described within U.S. Pat. No. 4,480,242 which Patent is incorporated herein for reference purposes. The thermal magnetic circuit interrupters 3 are used within circuits that mainly contain non-inductive devices.

Figure 3B:
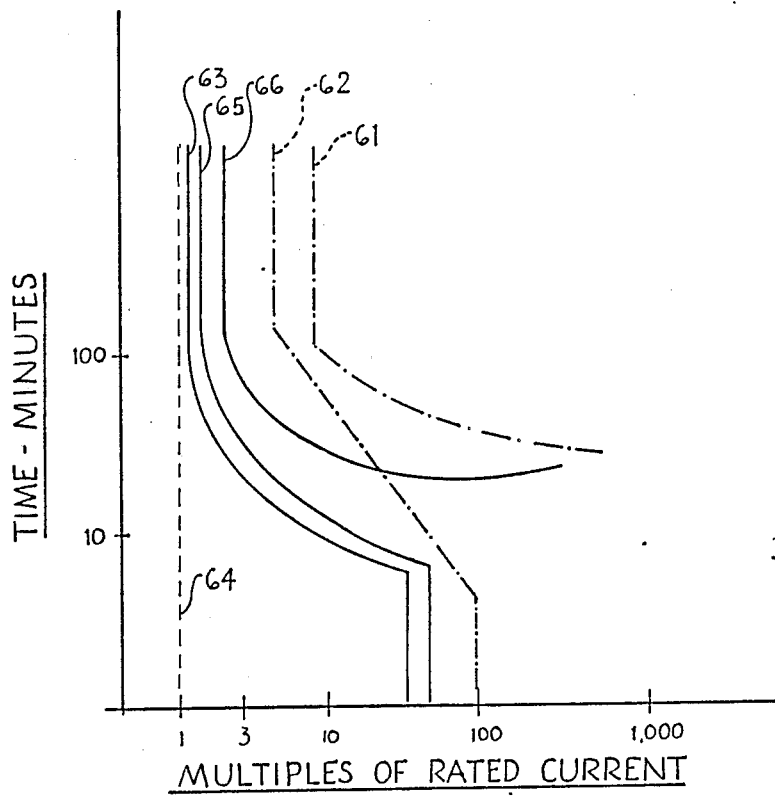
FIGS. 3A and 3B are graphic representations of triptime as a function of multiples of rated current for the circuit interruption devices depicted within the power delivery system of FIG. 2.
Figure 3A:
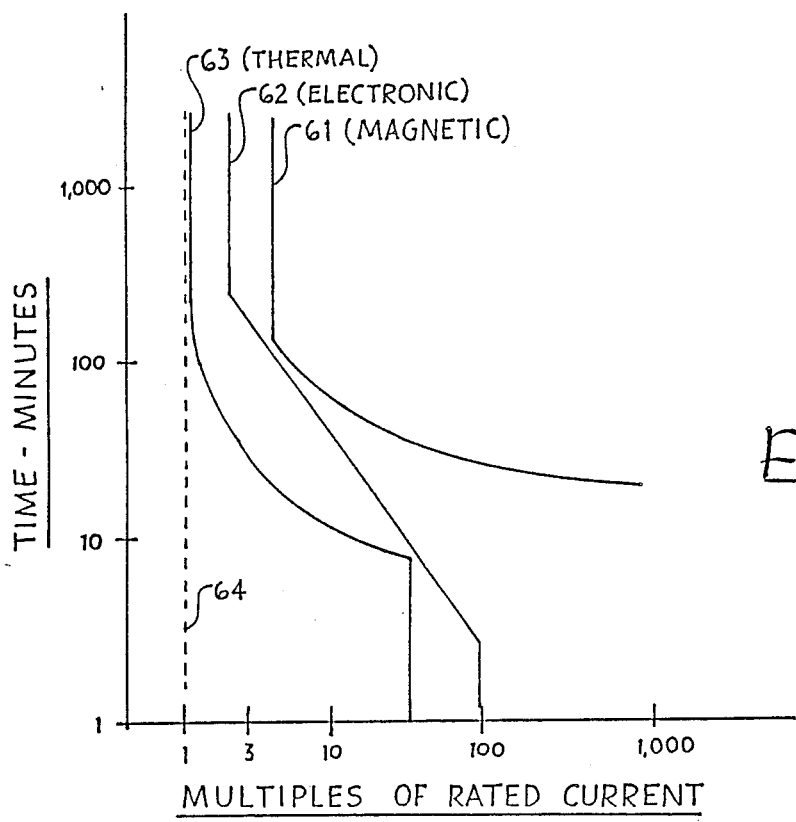

The trip-time curves for the circuit interruption devices within the electrical power distribution system 13 of FIG. 2 are depicted at FIG. 3A relative to the rated operating current indicated at 64. The thermal trip-time 63 for the circuit interruption devices 5, 3 of FIG. 2 is selected to operate before the electronic circuit interrupter 8 which interruption time is defined by the trip-time curve 62 and which in turn is selected to operate prior to the magnetic induction disc 14 which trip-time curve is indicated at 61. Coordination is achieved between the individual circuit interruption devices by setting the trip levels higher at each level of protection to insure that the circuit interrupter closest to the cause of the overcurrent condition will operate first. To compensate for the overlap in the time-overcurrent curve depicted in FIG. 1, the various circuit interruption devices are adjusted to provide the tripping times indicated at 61-63, in FIG. 3A. The distance between the individual curves insures that no overlap occurs for faults which occur above the branch circuit interruption device yet allows the higher current to flow for longer time periods. To prevent the feeder conductors 1, 7 and 6A-6D shown in FIG. 2 from overheating at the highest current levels, the conductors are intentionally oversized to substantially reduce $I^2R$ heating effects. It has since been determined, that by developing a tailored electronic tripping curve 65 to replace the prior art electronic tripping curve 62, the magnetic disc tripping curve can be displaced as indicated at 66 in FIG. 3B. The prior art electronic tripping curve 62 and the original magnetic disc tripping curve 61 are depicted in phantom to show the closer spacing resulting between the thermal, electronic and magnetic induction trip-time curves 63, 65 and 66. The close spacing between the individual tripping curves allows the size of the electrical conductors to be reduced while insuring that the circuit interruption device closest to the cause of the overcurrent condition will respond to interrupt the circuit current before the upstream breakers.

The tailored electronic trip-time curve 65 accordingly allows the electronic circuit interrupters to be used in place of existing magnetic disc relays or in combination therewith. The specific trip-time curve for each industrial power distribution system can be tailored in the field by providing a specific algorithm which extrapolates between the data points on the thermal magnetic trip curve 63 and the magnetic disc curve 61 of FIG. 3A. In order to prevent inadvertent modifications of the trip parameters stored within the memory of the electronic circuit interrupter, a removable keypad and display unit such as described within U.S. Pat. No. 4,870,531 can be employed. The removable keypad and display allows an operator accordingly to enter the trip points existing for the thermal magnetic and magnetic disc circuit interruption devices and by the application of specific alogrithms thereby tailor the specific electronic trip curve 66 of FIG. 3B for the thermal magnetic and magnetic disc interruption devices already existing in the industrial power distribution circuit.

The tailored electronic circuit interrupter trip curve 65 is generated from fixed points taken from curves (10-12) of FIG. 1 (or any other curve which can improve system protection and coordination) for values within the high, medium, low current ranges and applied to an appropriate logarithmic or linear interpolation algorithm. Logarithmic interpolation is selected to identify the trip points between the fixed points because of the logarithmic nature of the individual curves. The logarithmic values of the fixed points can be stored in memory in look-up-table format, if desired. Linear interpolation similarly can be used which provides a simpler processor implementation but a less exact fitting to the curve. The logarithmic interpolation algorithm for generating the tailored electronic trip curve is given as follows:

$$Tx = T(i - 1) + (T(i) - T(i - 1)) *$$

$$0.9954 * \log_{10}[(1 + 10 * (I_x^2 - I^2(i - 1))/(I^2(i) - I^2(i - 1))]$$

where
Tx is the interpolated trip-time;
Ix is the fault current;
i×index of the look-up-table
T(i-1) is the trip-time at I(i-14);
I(i-1) is the current of the nearest fixed point below the fault current;
T(i) is the trip-time at I(i);
I(i) is the current of the nearest fixed point above the fault current;
0.9954 is a scaling constant (1/log10(11)).
For a linear curve, the algorithm is simply:

$$Tx = T(i - 1) + (T(i) - T(i - 1)) *$$

-continued
$$(I_x - I(i-1))/(I(i) - I(i-1)).$$

Figure 4:
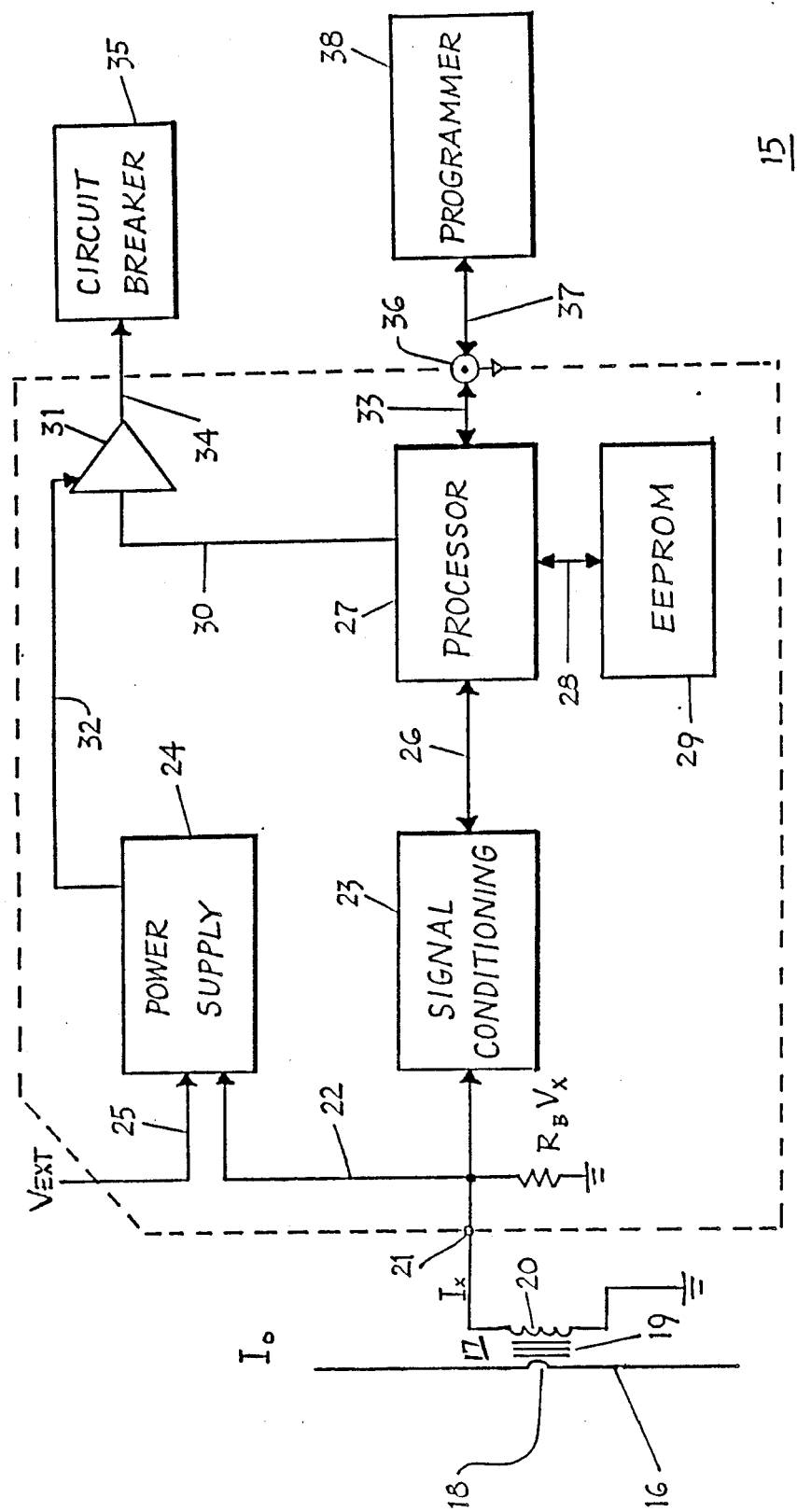
FIG. 4 is a diagrammatic representation of an electronic circuit interrupter employing a tailored overcurrent protection algorithm in accordance with the invention.

A digital circuit interrupter 15 for implementing the tailored electronic trip-time curve 65 of FIG. 3B is depicted in FIG. 4. The circuit interrupter is similar to that described within the aforementioned U.S. Pat. No. 4,672,501 wherein the circuit current $I_0$ flowing in one conductor 16 of a three-phase power distribution circuit is sampled by means of a current transformer 17 having a primary winding 18 arranged in series with the power conductor and a core 19. Although only one such power conductor and current transformer is shown, a separate power conductor and current transformer is employed for each separate phase of the threephase power distribution system. The secondary winding 20 is connected with the digital circuit interrupter 15 by means of terminal connector 21. A corresponding voltage signal $V_x$ is generated across a burden resistor $R_B$ in proportion to the secondary current. The voltage signal is directed over conductor 22 to the signal conditioning circuit 23 and to a power supply circuit 24 providing operating power to the other components within the circuit. An auxiliary source of power $V_{EXT}$ feeds the power supply circuit over conductor 25. The voltage signal is transmitted to a microprocessor 27 over data bus 26 for determining the occurrence of an overcurrent condition. The fixed points taken from the thermal and magnetic trip curves 63, 61 of FIG. 3A are stored in the EEPROM Memory 29 which connects with the processor circuit 27 over data bus 28.

The instructions to the processor are inputted from an external programmer 38 which temporarily connects with the processor by means of data bus 37, terminal connector 36 and data bus 33. The external programmer is used to store the specific points in the EEPROM. In normal operation, the programmer is not connected. Upon exceeding a predetermined current condition for a calculated time period, a trip signal is outputted from the processor to a buffer 31 over conductor 30 and from the buffer to the circuit breaker 35 over conductor 34. The buffer is powered by connection with the power supply 24 over conductor 32. The programmer 38 contains a separate microprocessor from that contained within the processor 27 and is described within the aforementioned U.S. Pat. No. 4,672,501. Upon receipt of an overcurrent condition on data bus 26, the processor calculates the corresponding trip-time by reading the fixed points stored in the EEPROM and stores these points in the volatile memory contained within the processor. Alternatively, all fixed points in the EEPROM may be read into volatile memory at power-up of the trip unit for rapid access or preprocessing, such as calculating the time differences between the fixed points. The processor then interpolates the integration rate that corresponds to the desired trip-time to provide the tailored electronic trip-time curve 65 described earlier with reference to FIG. 3B. While the time equations describe the desired effect for circuit breaker operation, an operational method is required within the microprocessor which includes the measurement of time. One method suggested here is digital integration. In digital integration, a register or group of registers or memory locations are updated at regular intervals which provides the necessary time measurement element. At each update, the registers are incremented, or decremented, at a rate proportional to the desired variable, which is the current in this instance. At each update, the registers are also compared to a maximum count to indicate the completion of the integration.

The time equation must be converted to an equation which provides an increment value. This value is a function of the maximum count, algorithm rate and desired time and is given by the expression:

$$D = \frac{C}{R * T_x}$$

where
D is the delta increment
C is the maximum count
R is the algorithm frequency (1/interval)
$T_x$ is the time to trip As C and R are constants for any give design, the delta increment D is inversely proportional to the desired time. This suggests an operational improvement of storing delta values at fixed points rather than time values. The logarithmic interpolation is readily converted using stored delta points as follows:

$$D_x \times D(i-1) + (D(i) - D(i-1)) * 0.9954 * \log_{10}[(I_x^2 - I^2(i-1))/(I^2(i) - I^2(i-1))]$$

where
$D_x$ is the calculated delta for current $I_x$
$D(i)$ is delta for current $I(i)$
$D(i-1)$ is delta for current $I(i-1)$
$I(i)$, $I(i-1)$ are as before.
Similarly, the linear time equation is converted as follows:

$$D_x = D(i-1) - (D(i) - D(i-1)) * (I_x - I(i-1))/(I(i) - I(i-1))$$

The processor 27 provides the trip output signal to the circuit breaker 35 after timing out the calculated trip-time.

The programmer 38 is not part of the digital circuit interrupter 15 and, as described earlier provides the means to enter the interpolation curve data points into the EEPROM (29). It can include a digital communication link over data bus 37 as part of the factoryinstalled digital circuit interrupter or can be a remote field operable device, such as described within the aforementioned U.S. Pat. No. 4,870,531 if so desired.

Figure 5:
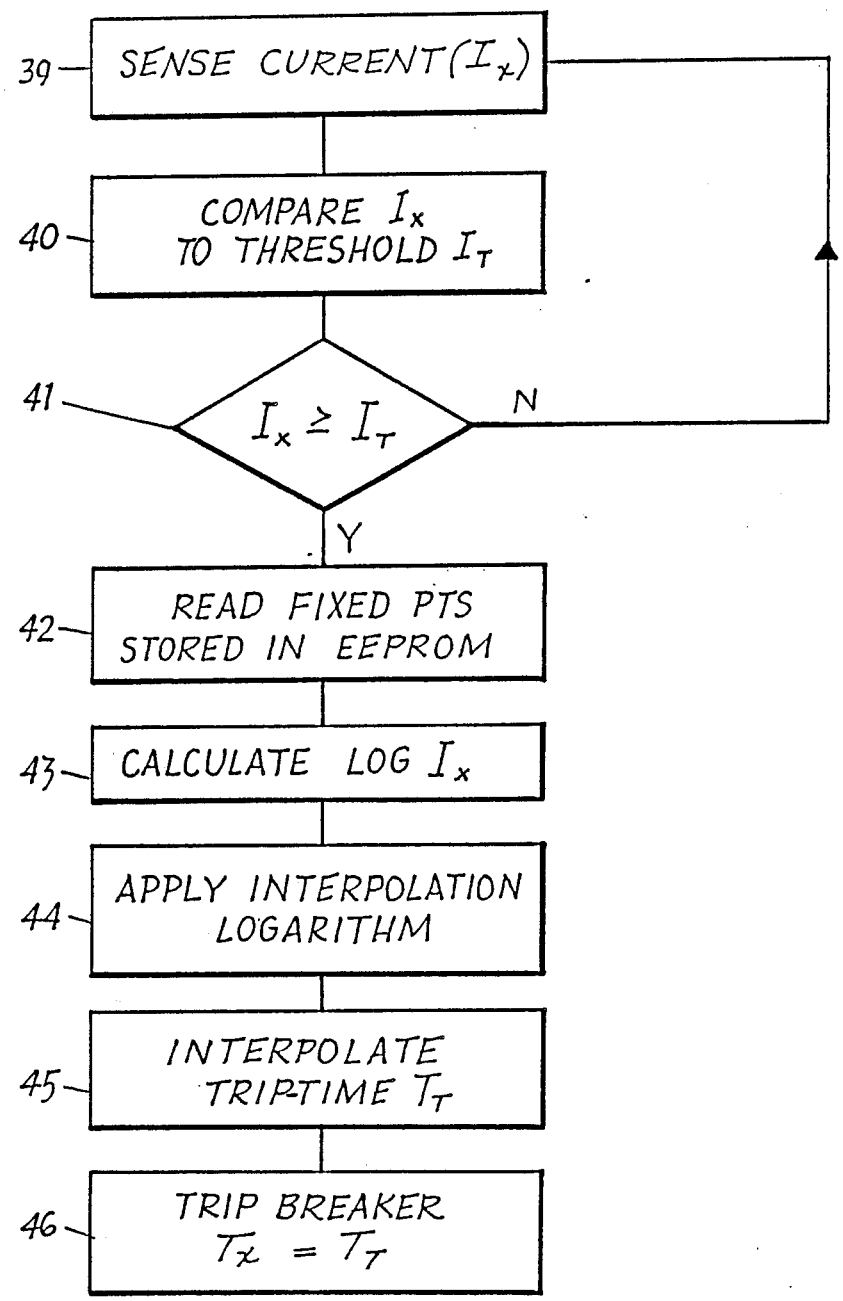
FIG. 5 is a flow diagram of the operation of the electronic circuit interrupter depicted in FIG. 4.

The operation of the digital circuit interrupter 15 is best seen by now referring to both the flow diagram depicted in FIG. 5 and the digital circuit interrupter 15 shown in FIG. 4. The circuit current $I_0$ is sensed continuously (39) as $I_x$ and is inputted to the processor 27 over the data bus 26. The current signal is compared to a threshold value $I_T$ (40) to determine the occurrence of an overcurrent condition. Upon the occurrence of an overcurrent condition (41) the processor reads the fixed points stored in the EEPROM (42) and calculates the logarithmic value of the current signal $I_x$ (43). The interpolation algorithm is applied (44) and the delta increment, $D_x$ is calculated and added to the register $C_x$ to interpolate the trip-time (45). After $C_x$ reaches the calculated maximum count, a trip signal (46) is supplied to the circuit breaker 35 through the buffer 31 and conductors 30, 34 to interrupt the circuit.

Figure 6:
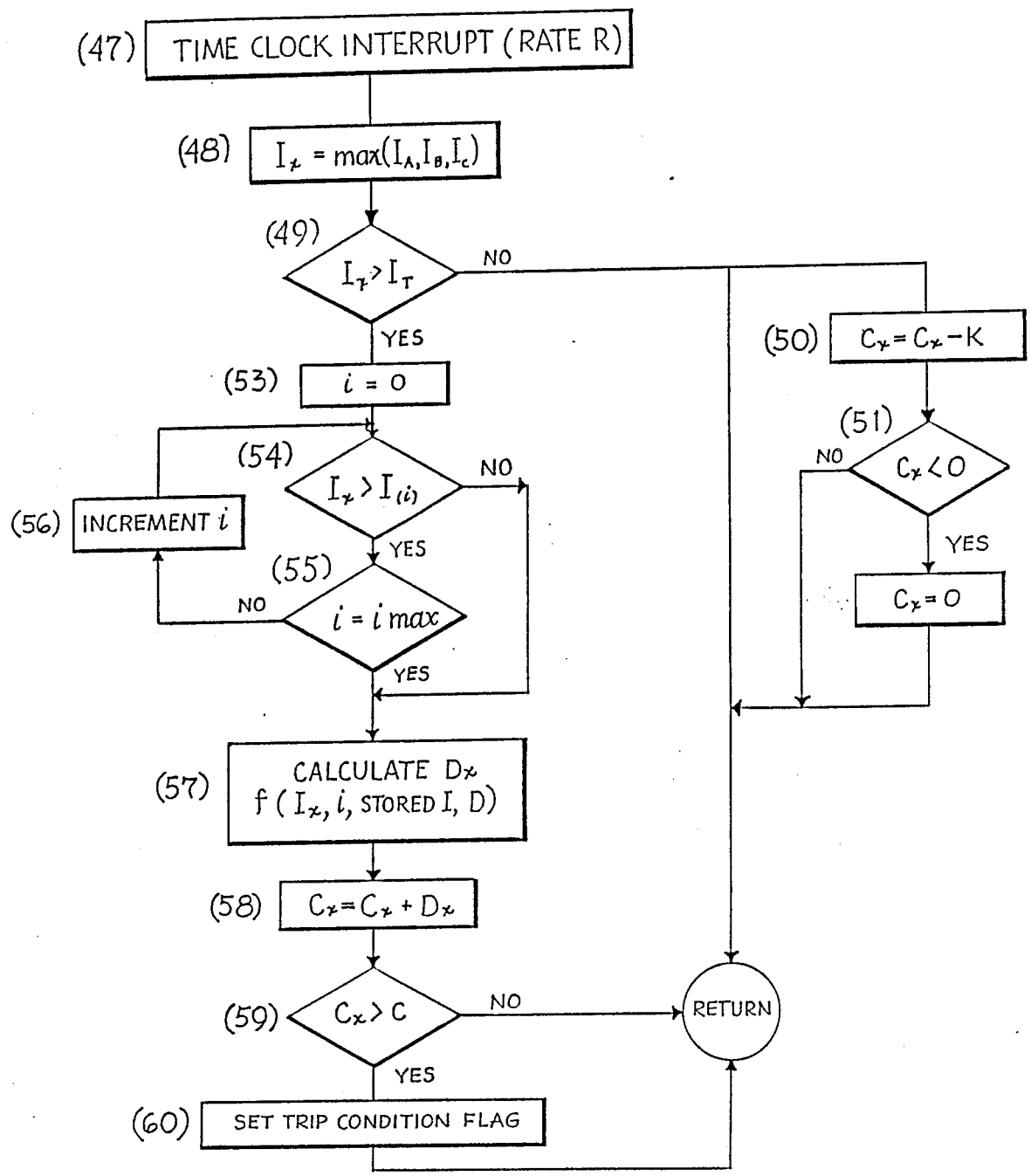
FIG. 6 is a flow diagram of the interpolation logarithm used within the electronic circuit interrupter of FIG. 4.

The implementation of the interpolation algorithm is best seen by referring now to FIG. 6 wherein the operational program for the interpolation algorithm proceeds as follows. The time block interrupt rate R (47) causes the routine to be repeated at regular intervals and the maximum current $I_x$ is determined from each of the separate phase conductors (48). If the maximum circuit current is not greater than the threshold current $I_T$ (49) a cooling algorithm is implemented whereby the register $C_x$ is decremented at a fixed rate K (50). If the register is not less than 0 (51) the routine ends until the next time clock interrupt. If the maximum current $I_x$ is greater than threshold then the index i is made equal to 0 (53) and a determination is made to determine whether the maximum current $I_x$ is greater than the current $I_i$ (54) and if not, the delta points $D_x$ are calculated and stored in memory (57). If the maximum current is greater than $I_x$ (55), the index i is compared to i max, and if not at a maximum, the index i is incremented (56) until the interval to interpolate is found. Once the delta points $D_x$ are calculated and stored (57) the delta points are added to the register (58) and a determination is made as to whether the register exceeds a predetermined count (59) and if not the routine ends and if the register does exceed the count value, trip flag condition is set (60) and then the routine ends.

A tailored electronic trip-time curve has herein been described for a digital circuit interrupter coordinated with downstream or branch circuits employing thermal and magnetic circuit relays. The microprocessor within the digital circuit interrupter is accessed by means of a programmer for introducing fixed set points to the microprocessor and for storing the set points in an associated EEPROM.

Having thus described my invention, what I claim as new and desire to secure by Letters Patent is:

1. A digital circuit interrupter with selectable trip parameters comprising:
   current means for determining circuit current in an electrical power distribution system;
   a microprocessor connected with said current means for determining the occurrence of an overcurrent through said electrical power distribution system and interrupting said overcurrent after a calculated time delay; and
   memory means connected with said microprocessor and containing fixed data points corresponding to thermal and magnetic circuit interruption devices, said memory means further including a logarithmic interpolation algorithm for interpolating between said fixed data points to generate a continuous representation of said calculated time delay.

2. The digital circuit interrupter of claim 1 including a cooling algorithm in combination with said interpolation algorithm to simulate cooling of cables within said electrical power delivery system after cessation of said overcurent condition.

3. The digital circuit interrupter of claim 1 wherein said memory means comprise electrically erasable memory.

4. The digital circuit interrupter of claim 1 wherein said fixed data points are installed within said memory means at the time of manufacturing said digital circuit interrupter.

5. The digital circuit interrupter of claim 1 wherein said fixed data points are installed within said memory means at the time of utilizing said digital circuit interrupter.

6. An electrical distribution system having tailored protection parameters comprising, in combination:
   a main supply conductor connected with a plurality of branch supply conductors;
   an electronic circuit interrupter serially connected within said main supply conductor and including interruption means, a microprocessor and memory means; and
   at least one magnetic relay circuit interrupter serially connected within one of said branch supply conductors for protecting electrical equipment connected with said one branch supply conductor, said memory means including fixed protection parameters corresponding to said magnetic relay circuit interrupter and a logarithmic interpolation algorithm whereby said microprocessor calculates an ideal tripping-time curve from said fixed protection parameters upon the occurrence of an overcurrent condition within said main supply conductor or said one branch supply conductor.

7. An electrical distribution system having tailored protection parameters comprising, in combination:
   a main supply conductor connected with a plurality of branch supply conductors;
   an electronic circuit interrupter serially connected within said main supply conductor and including interruption means, a microprocessor means and memory means; and
   at least one thermal relay circuit interrupter serially connected within one of said branch supply conductors for protecting electrical equipment connected with said one branch supply conductor, said memory means including fixed protection parameters corresponding to said thermal relay circuit interrupter and a logarithmic interpolation algorithm whereby said microprocessor calculates an ideal tripping-time curve from said fixed protection parameters upon the occurrence of an overcurrent condition within said main supply conductor or said one branch supply conductor.

8. An electrical distribution system having tailored protection parameters comprising, in combination:
   a main supply conductor connected with a plurality of branch supply conductors;
   an electronic circuit interrupter serially connected within said main supply conductor and including interruption means, a microprocessor and memory means; and
   at least one thermal-magnetic circuit interrupter serially connected within one of said branch supply conductors for protecting electrical equipment connected with said one branch supply conductor, said memory means including fixed protection parameters corresponding to said thermal-magnetic circuit interrupter and a logarithmic interpolation algorithm whereby said microprocessor calculates an ideal tripping-time curve from said fixed protection parameters upon the occurrence of an overcurrent condition within said main supply conductor or said one branch supply conductor.

9. The electrical distribution system of claims 6 or 7 or 8 wherein said memory means comprise electrically erasable memory.

10. An electrical distribution system having tailored protection parameters comprising, in combination:
    a main supply conductor connected with a plurality of branch supply conductors;
    an electronic circuit interrupter serially connected within said main supply conductor and including interruption means, microprocessor and memory means; and
    at least one voltage relay or at least one power relay connected within one of said branch supply conductors for protecting electrical equipment connected with said one branch supply conductor, said memory means including fixed protection parameters corresponding to said voltage relay or said power relay and a logarithmic interpolation algorithm whereby said microprocessor calculates an ideal tripping-time curve from said fixed protection parameters upon the occurrence of an overcurrent condition within said main supply conductor or said one branch supply conductor.

* * * * *